United States Patent [19]

Gasbarro

[11] Patent Number: 4,941,379
[45] Date of Patent: Jul. 17, 1990

[54] APPARATUS FOR PRODUCING SIZED CONTROLLED PORTIONS OF MEAT

[76] Inventor: Geno N. Gasbarro, 1401-B Lakeshore Dr., Columbus, Ohio 43204

[21] Appl. No.: 364,232

[22] Filed: Jun. 12, 1989

[51] Int. Cl.$^5$ .......................... B26D 7/06; B26F 3/00; A72C 71/00
[52] U.S. Cl. ...................................... 83/409.2; 17/52; 83/177; 83/428; 83/434; 83/565; 198/631
[58] Field of Search .............................. 17/11, 52, 51; 83/409.2, 409.1, 409, 155.1, 428, 434, 435.2, 734, 565, 177; 198/631, 384

[56] References Cited

U.S. PATENT DOCUMENTS

| | | | |
|---|---|---|---|
| 1,155,455 | 1/1914 | Wegner | 83/409.2 X |
| 1,187,143 | 6/1916 | Hanel | 198/631 |
| 2,571,531 | 9/1948 | Bridge | 83/155.1 X |
| 2,961,023 | 11/1960 | Boyer | 83/475.3 X |
| 3,154,124 | 10/1964 | Cimino | 83/409.2 X |
| 3,273,618 | 9/1966 | Flodin | 83/435.2 X |
| 3,843,998 | 10/1974 | Wenzel | 17/52 X |
| 4,327,616 | 5/1982 | Klukis | 83/409.2 |
| 4,363,341 | 12/1982 | Powell | 198/631 X |
| 4,648,156 | 3/1987 | Meyn | 17/11 X |

Primary Examiner—Douglas D. Watts
Assistant Examiner—Kenneth E. Peterson
Attorney, Agent, or Firm—Francis T. Kremblas, Jr.

[57] ABSTRACT

An automated meat portion sizing apparatus is disclosed which includes a plurality of mandrels provided with a meat-receiving sizing chamber mounted on a support frame for repetitive travel between a loading and unloading station. The sizing chambers are conformed to receive a selected shape and volume of a meat portion to provide the selected weight portion desired. A knife is provided along the path of travel to remove any excess meat portion extending outside the sizing chamber. The excess portion is collected separately prior to the mandrel reaching the unloading station where the controlled size portion is automatically removed from the sizing chamber for convenient collection.

15 Claims, 9 Drawing Sheets

APPARATUS FOR PRODUCING SIZED CONTROLLED PORTIONS OF MEAT

BACKGROUND

The present invention relates generally to meat processing methods and apparatus. The food industry has for many years requested suppliers to deliver portions of meat of selected size and weight. Particularly, restaurants and other food services are interested in portion control of meat in order to provide a consistent portion of meat to customers which permits a degree of quality control as well as economy.

In most instances, such control of meat portions has required manual cutting, sizing and weighing to deliver a portion having the selected configuration and weight. With the advent of the large fast food chains and the introduction of pieces of poultry, namely chicken, sold in a variety of sizes and shapes, a high demand for portion control has evolved over the last decade or so. Presently, this demand of closely controlled portions of chicken breast has required the time consuming, relatively high cost manual process which is, by its very nature, less exact and consistent than desired. It also depends to an undesirable degree on the experience, skill and care of the manual cutters to reduce the amount of scrap portions created which must be sold at much lower prices to other end users.

Prior to the present invention, the need for an automated apparatus capable of reliably providing a closely controlled portion of meat, and particularly poultry breast, having a selected size and weight has been unfulfilled by those skilled in the art. Therefore the huge demand for such portion controlled products has been filled by the manual method over the past many years such products have been produced for the industry.

BRIEF DISCLOSURE OF INVENTION

The present invention relates generally to means providing controlled meat portions and particularly to an automatic apparatus particularly well-suited for producing selected poultry portions having a consistent size, shape and weight adapted to a given customer requirement.

The apparatus comprises in general, a support frame upon which is mounted a plurality of meat receiving mandrels aligned adjacent to one another in side by side relationship for continuous movement along the frame in a pre-determined repeating or continuous path.

Each mandrel includes a sizing chamber adapted to receive a given shape and volume of a poultry breast portion through a top opening configured to receive the desired meat portion. In general, the mandrels are loaded at a given point along the path and move past a cutting station to trim excess meat not contained in the sizing chamber whereby the excess meat is automatically severed as the mandrel passes. The mandrel continues on the defined path which causes it to be inverted as it approaches an unloading station where means are provided to automatically urge the sized meat portion to fall through the top opening for collection.

The mandrels are removably bolted on a continuous chain in a manner to allow the mandrels to be easily changed to accommodate different selected portions as the given application may require. After the meat portions are loaded, means are provided to vibrate the mandrels along a portion of the path to assure a repetitive, consistent loading of the meat into the sizing chamber.

Additionally, the front and rear walls forming the sizing chamber are yieldably connected to facilitate loading and unloading. Means are provided along the continuous path of the mandrels to "squeeze" or force the front wall toward the upper edge of the side walls to assure a consistent volume of the sizing chamber is maintained at the cutting station. After trimming is completed, the front wall is released to return to its original position.

As one aspect of the present invention, the apparatus provides greater quality control of portion size while dramatically increasing the production rate as compared to the prior manual method of processing such meat portions.

As another aspect, the apparatus of the present invention reduces the manual labor required in such processing and increases the safety factor by eliminating manual trimming of the desired meat portion wherein manual cutting techniques have been previously required.

As a further aspect of the present invention, very significant cost savings are provided by a reducing the likelihood of human error which increase scrap losses as compared to the prior methods and means.

Therefore, it is a primary object of the present invention to provide an automated processing apparatus which provides a meat portion having selected size, shape and weight in a more efficient and safe manner compared to prior art methods and means and dramatically increases production rates.

It is another object of the present invention to provide an apparatus of the type described which dramatically reduces the manual labor required for volume production of closely controlled portions of meat.

It is another object of the present invention to provide an apparatus of the type described wherein a plurality of meat portion receiving mandrels are moved in a continuous revolving path between loading and unloading station and provide weight portion control employing a sizing chamber based upon volume.

It is a further object of the present invention to provide an apparatus of the type described wherein excess meat is trimmed by an automated cutting means as the mandrels are continuously moved along between the loading and unloading stations to eliminate the hazards and errors associated with manual cutting processes It is yet another object of the present invention to provide an apparatus of the type described which provides the above mentioned advantages and yet is relatively simple to manufacture and use.

Further objects and advantages of the present invention will be apparent from the following description, references being had to the accompanying drawings wherein a preferred form of embodiment of the invention is clearly shown.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION

Figure 1:
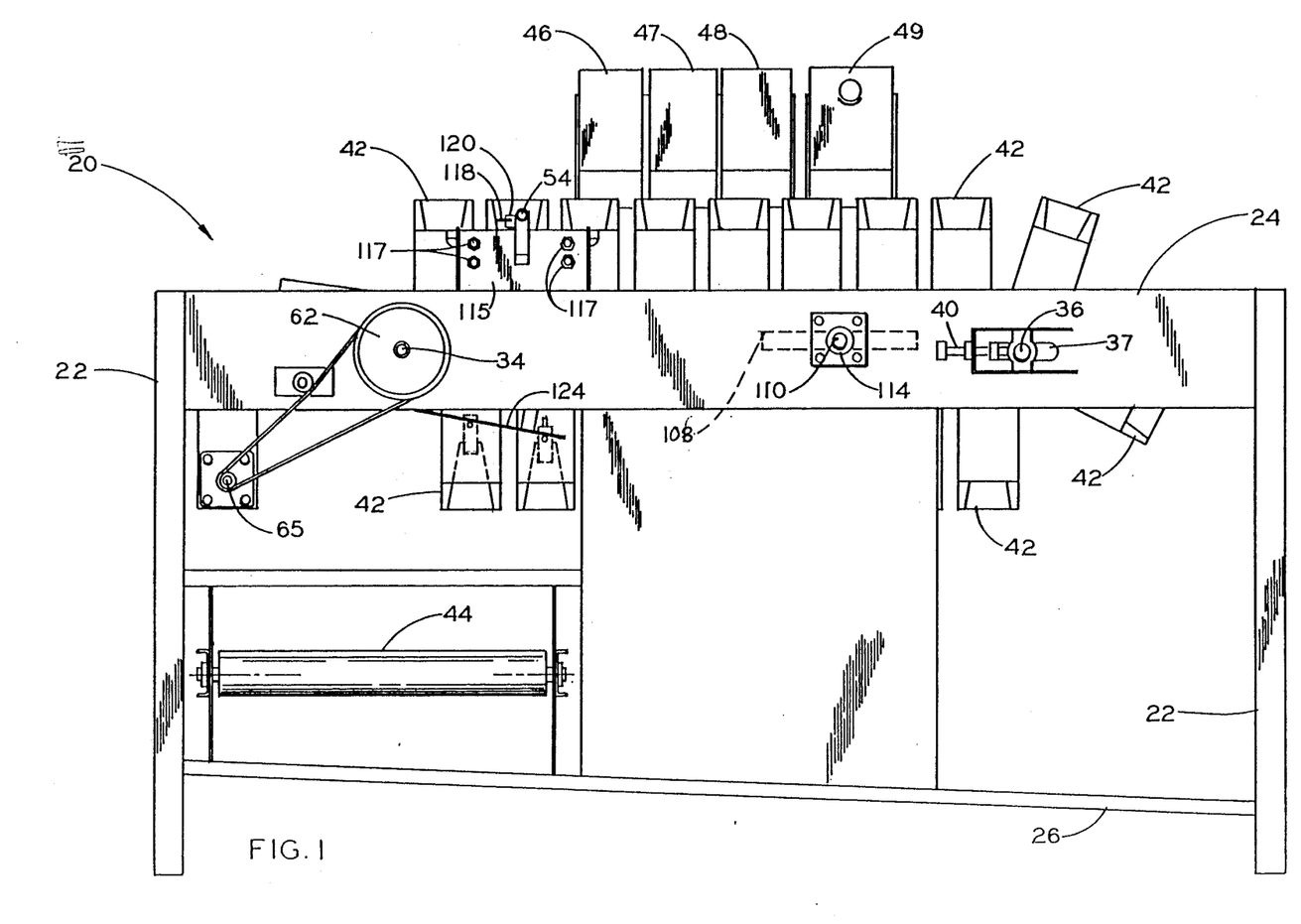
FIGS. 1 is front elevational view of an apparatus for producing sized portions of meat constructed in accordance with the present invention.
Figure 2:
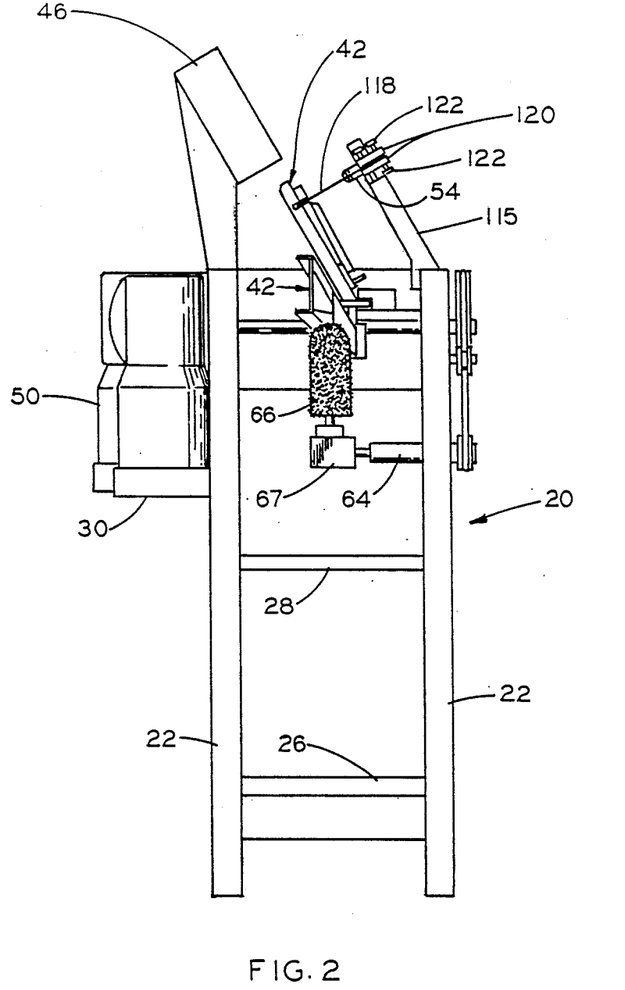
FIG. 2 is a left end elevational view of the apparatus shown in FIG. 1.
Figure 3:
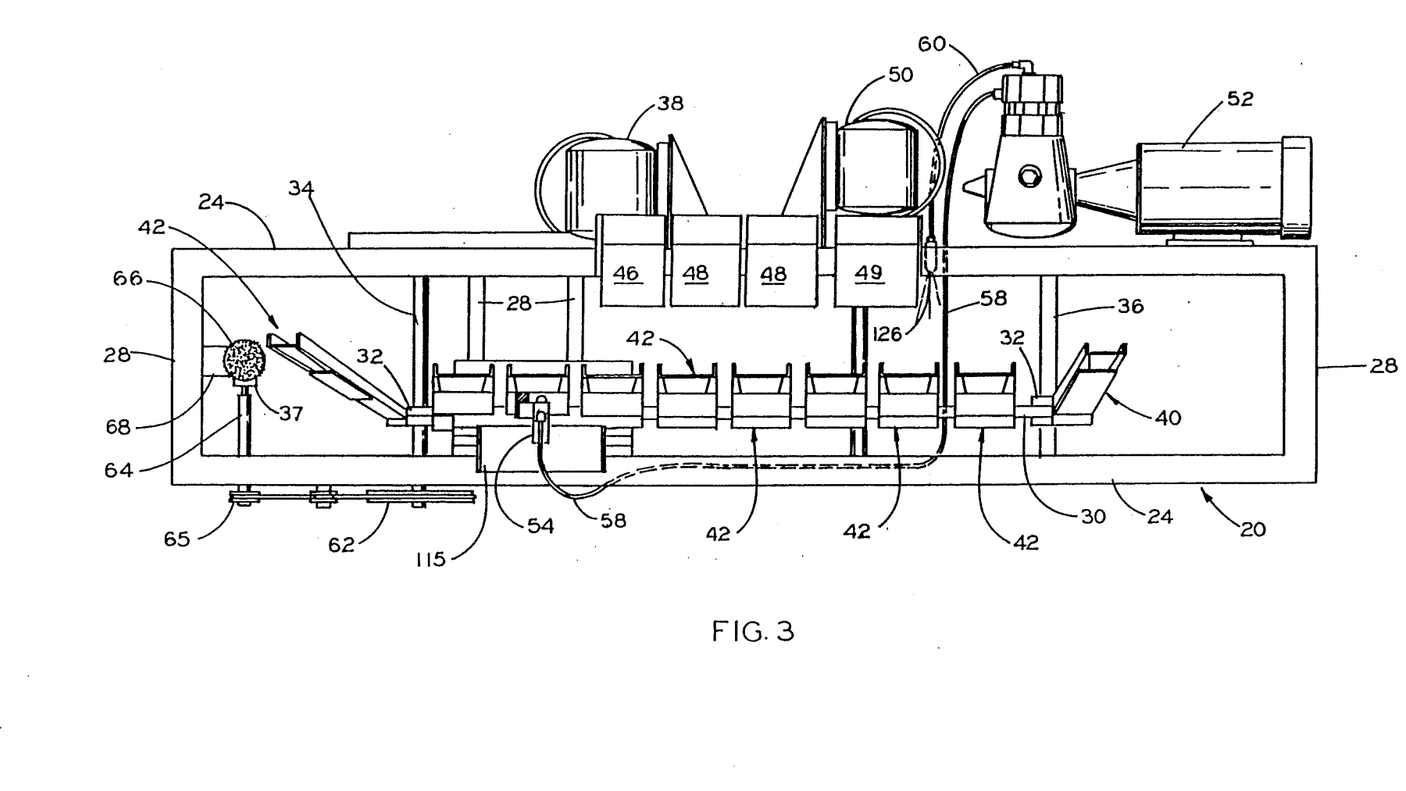
FIG. 3 is a plan view of the apparatus shown in FIG. 1.

An apparatus for automatically producing meat portions having a selected shape and weight constructed in accordance with the present invention is shown in FIGS. 1-3 and includes a supporting frame 20. Frame 20 includes vertical legs 22, upper beams 24, lower beams 26, and cross members 28.

A continuous chain 30 is supported on frame 20 by a pair of sprockets 32, which in turn, are mounted on shafts 34 and 36 rotatably mounted to frame 20 in a conventional manner. Shaft 34 is operatively connected to an electric motor 38 and idler shaft 36 is adjustably mounted in a slot 37 provided in beam 24 via threaded member 40 to permit the chain tension to be adjusted in a well-known manner.

A plurality of mandrels, indicated generally at 42, are mounted on chain 30 to move in a predetermined continuous path between a loading station at the right end of frame 20 as seen in FIG. 1 and an unloading station at the left end of frame 20 above a conventional collecting conveyor assembly 44

A plurality of conventional electric boxes 46, 47, 48 and 49 are provided with conventional controls and switches for the electric motors 38, 50 and the water pump and motor assembly 52.

Pump assembly 52 provides water under high pressure to a water knife 54 and low pressure to cleaning spray nozzle 56 via hoses 58 and 60.

Another sprocket 62 is mounted on driving shaft 34 and operatively connected to a shaft 64 via sprocket 65. Shaft 64 is connected via conventional gearing to a brush 66 rotatably mounted on a gear box 67 supported by an arm 68 which is fixed to frame 20. Brush 66 is located to engage the upper portion of each mandrel 42 to assure removal of any excess meat portions trimmed by water knife 54 for separate collection of these scraps apart from the collection area for the controlled portions.

Figure 10:
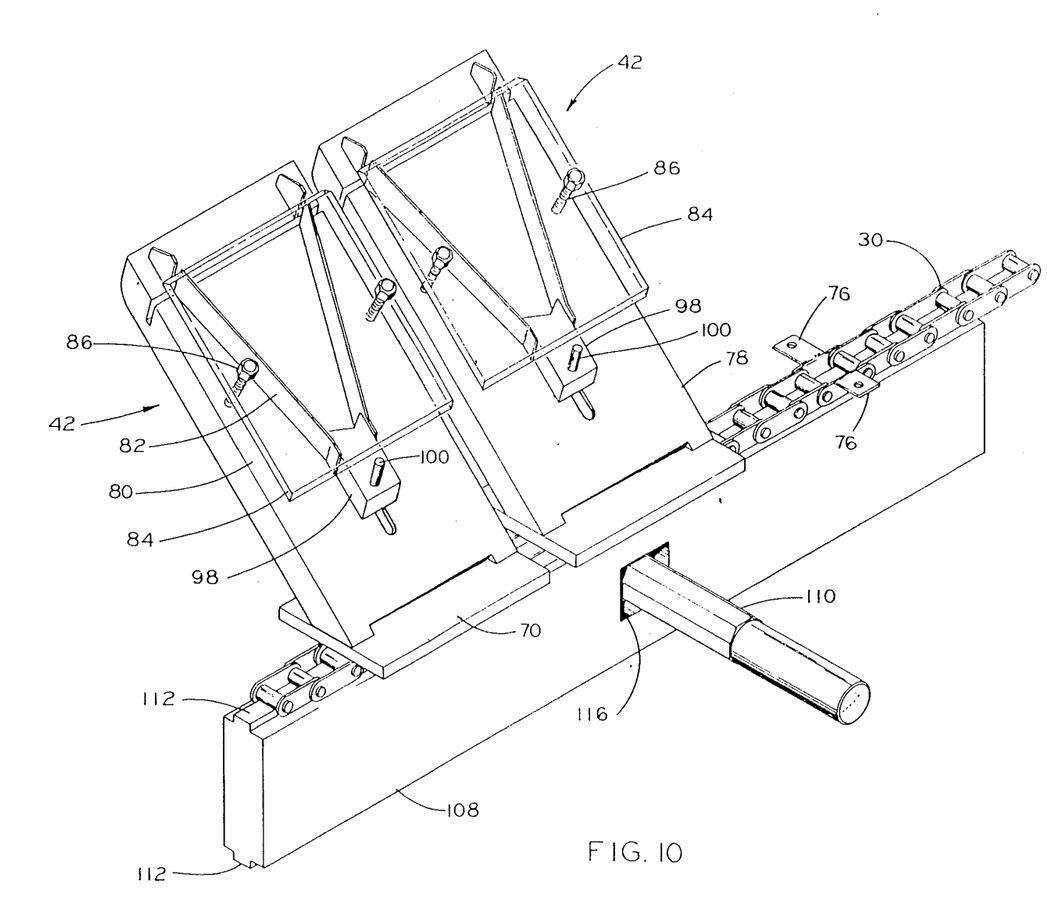
FIG. 10 is a perspective view of the mandrels and continuous chain illustrating the means to vibrate the mandrels along portion of the path traveled by the continuous chain.

With reference to FIGS. 4-8 each mandrel 42 includes a base 70 provided with a pair of spaced threaded fasteners 74 welded to the bottom surface of base 70. Fasteners 74 extend through wing flanges 76 provided on chain 30 as best seen in FIG. 10. A conventional threaded nut, not shown, is employed to fix the engagement between fasteners 74 and flanges 76 to removably mount mandrels 42 on chain 30.

A vertically extending support member 78 is fixed to base 70, by welding for example, and supports a sizing chamber formed by a rear wall 80, side walls 82 and a front wall 84 which is yieldably fixed to rear wall 80. The yieldable attachment is formed by a pair of outwardly extending posts 86 provided with threaded end portions received through aligned bores 88 provided in front wall 84. A coil spring 90 is disposed around each post 88 between rear wall 80 and front wall 84 urging front wall 84 away from rear wall 80. Front wall 84 is adjustably fixed a selected distance from rear wall 80 against the force of spring 90 by a threaded nut 92 received by the threaded en portions of posts 88.

Figure 4:
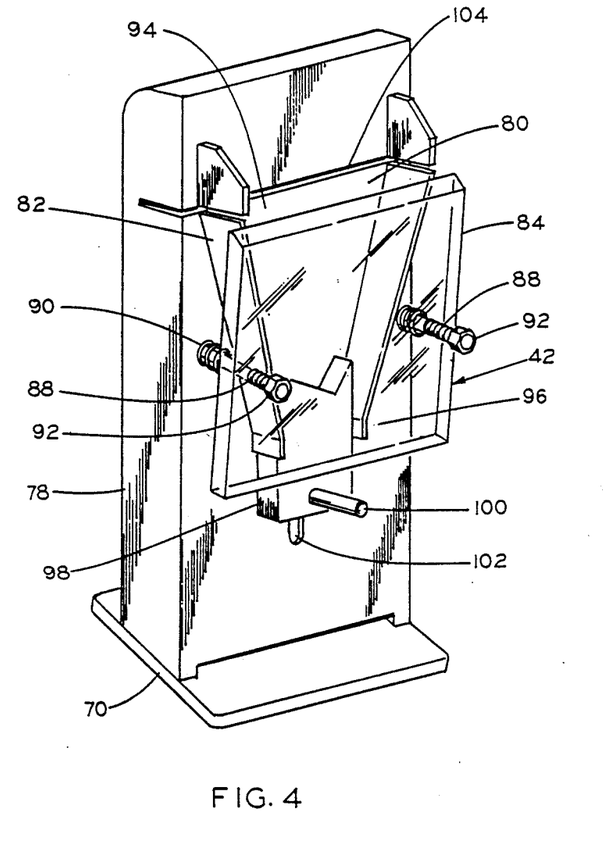
FIG. 4 is a perspective view of a meat portion receiving mandrel forming a portion of the apparatus shown in FIG. 1, the mandrel being shown apart from the remainder of the apparatus.
Figure 5:
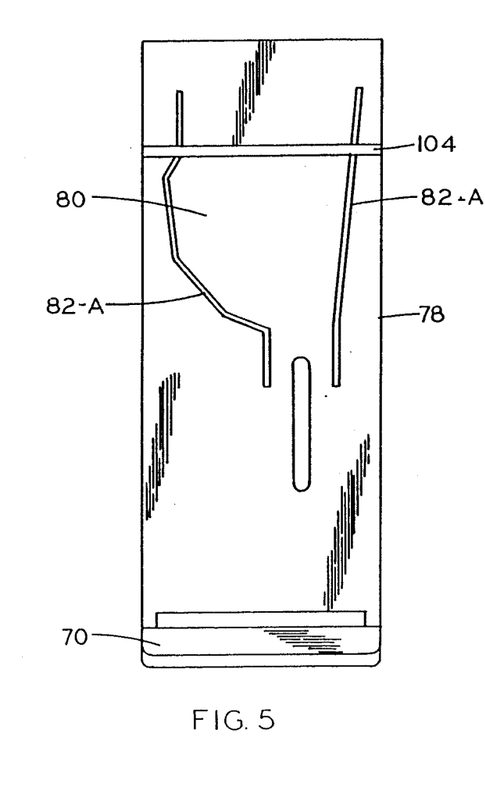
FIG. 5 is a front view of another mandrel similar to the one shown in FIG. 5 but provided with a sizing chamber adapted to receive a different size portion of meat.
Figure 6:
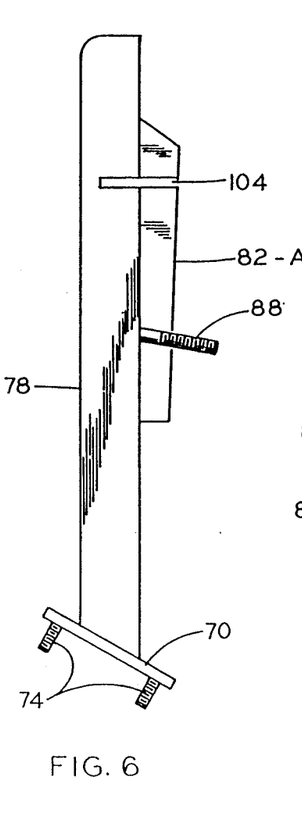
FIG. 6 is a side elevational view of the mandrel shown in FIG. 5.
Figure 7:
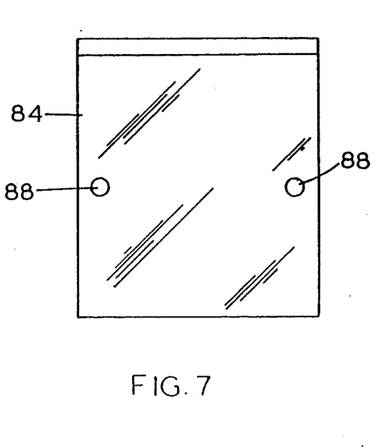
FIG. 7 is a front view of the closure member forming a front wall of the sizing chamber provided on mandrels such as shown in FIGS. 4 and 6; the front wall being shown apart from the mandrel.
Figure 8:
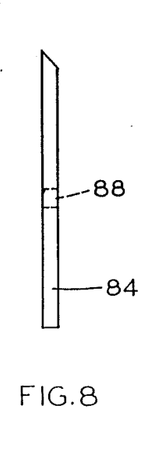
FIG. 8 is a side view of the front wall shown in FIG. 7.

In the embodiment shown herein, front wall 84 preferably is formed from a clear, strong plastic material which permits one to see the meat portion positioned within the sizing chamber. A material sold under the trademark LEXAN is one of the preferred materials However, the particular material or the transparent feature are merely desirable and not necessary to the general function or result obtained using the present invention.

The particular configuration of the sizing chamber is selected according to the desired shape and weight of the meat portion to be produced The volume and shape may be varied by merely employing a different configuration of side walls 82, such as seen in the modified mandrel shown in FIGS. 5-8 wherein corresponding parts are identified by the same reference numerals and the modified components are followed by the letter A.

It should be readily appreciated that the volume and hence the weight of the meat portion may also be adjusted by increasing or decreasing the spacing between front and rear walls 80 and 84 by increasing or decreasing the height of side walls 82.

The defined sizing chamber has a top opening, indicated at 94, to receive the meat portion and a smaller bottom opening, indicated at 96, through which a slideably mounted knock-out member 98 may enter the chamber.

Knock-out member 98 is preferably made of nylon or other plastic material to withstand wear and is slideably mounted between front and rear walls 80 and 84 by an outwardly extending post 100 fixed to member 98. Post 100 freely rides in a vertical slot 102 provided in rear wall 80. Alternatively, post 100 may be mounted through a slot provided in front wall 84 to obtain the same effect.

When mandrel 42 is in an upright or loading position on chain 30, knock-out member 98 falls to the lowest position defined by slot 102 with its upper portion closely adjacent to bottom opening 96 effectively closing the bottom opening to any meat portion inserted into the sizing chamber. During travel of mandrel 42 on chain 30, knock-out member 98 is caused to slide into the sizing chamber to dislodge the sized meat portion at an unloading station as described in detail later herein.

A horizontal slot 104 is provided across rear wall 80 and an upper extension of side walls 82 at a position selected to generally conform to the upper limit of the sizing chamber and generally across with the upper edge of front wall 84. Slot 104 also accommodates an optional auxiliary cutting means in the form of a knife blade 118 which may be provided to assure separation of any excess meat portion trimmed by water knife 54.

The selected volume and configuration of the described sizing chamber shown herein is particularly designed to accommodate the sizing of portions of poultry breasts heretofore manually cut to size in the industry. For example, whole or halved chicken breasts are further processed into selected sized portions for fast food restaurants which demand a given weight breast portion having a selected shape in order to provide a consistent equal portion to their customers. Half breast portions are referred to as "split breasts" in the trade.

Prior to the present invention, controlled portions have been cut from the whole or split breast portion, however, the manual labor involved often provides less than satisfactory consistency at relatively high cost. The manual skill involved requires a certain degree of dexterity and experience in order to produce a reasonable level of consistency.

However, employing the novel apparatus of the present invention, a given breast portion can be quickly and consistently produced at dramatically lower labor costs and with a much higher level of quality regarding the consistency of weight and shape of the selected portion.

A half breast portion, for example, may be divided into two primary portions. The larger portion consists of all but the inner strip of loin meat located along and adjacent to the backbone. This loin strip is sometimes referred to as "tenders" by those in the trade. These two portions are usually separated from one another for purposes of producing controlled portions of either type for most customers.

All of these portions ar sized for selected controlled portions with particular variations occurring as may be desired by a given customer. The present invention will function basically in a similar fashion with either of these portions to provide the controlled portion ordered by a customer.

With reference again to FIGS. 1-3, the operator loads the particular breast portion into a mandrel 42 having a sizing chamber selected to provide the desired shape and weight of the breast portion. In view of the natural shape and size of either the outer breast part or the "tender", typically more variation of the selected sized portion is available with the former than the rather narrow shape of the latter.

However, which ever piece is being used, loading is accomplished by inserting the initial poultry breast piece partially into the top opening 94 as each mandrel 42 passe the loading station at the right end of frame 20 as seen in FIG. 1.

This may be done in a very rapid manner as the operator is instructed not to attempt to load the meat portion forcefully or fully into the sizing chamber. This is neither necessary nor desirable as it may introduce a factor of inconsistency between the particular practice of each operator as to the volume of meat forced into the sizing chamber.

In the present invention, the consistency of loading is addressed as the mandrel 42 continues on its path. Adjacent to the loading station, a vibrating means in the form of a teflon block 108, supported by a rotating polygonal shaped shaft 110, engages chain 30. Vibration of block 108 imparts a vibrating action to chain 30 and hence each mandrel which tends to assure that the poultry piece slides downwardly fully into the sizing chamber.

Since the meat parts are wet and generally slippery to the touch, they readily respond to gravity and the vibrating motion to fill the chamber defined by rear, side and front walls 80, 82 and 84 in a very consistent manner such that the volume of meat within the sizing chamber is substantially the same for each portion. Since the density of poultry breast meat is relatively uniform, the volume method for determining the selected portion weight falls within a close and very acceptable tolerance range particularly as compared to the present manual methods used to produce such portions.

With reference to FIGS. 1 and 10, block 108 is provided with a rib 112 extending from its upper and lower surface. The upper rib engages the bottom of the links of chain 30. Shaft 110 which may be rotatably supported on frame 20 in any conventional manner and operatively connected to drive motor 50 at one end and journaled in a bushing 114 at the other end which is supported by frame member 24. Block 108 is provided with a square hole 116 through which shaft 110 extends Rotation of the polygonal shaped shaft in the square hole 116 imparts a vibrating motion in block 108 which is transmitted to chain 30 and mandrels 42 as they pass along the length of block 108.

After a period of extended use and wear of the upper rib 112 occurs, the block 108 may be inverted to expose an identical lower rib 112 until such time as wear of its surface requires replacement with a new block 108.

Figure 9:
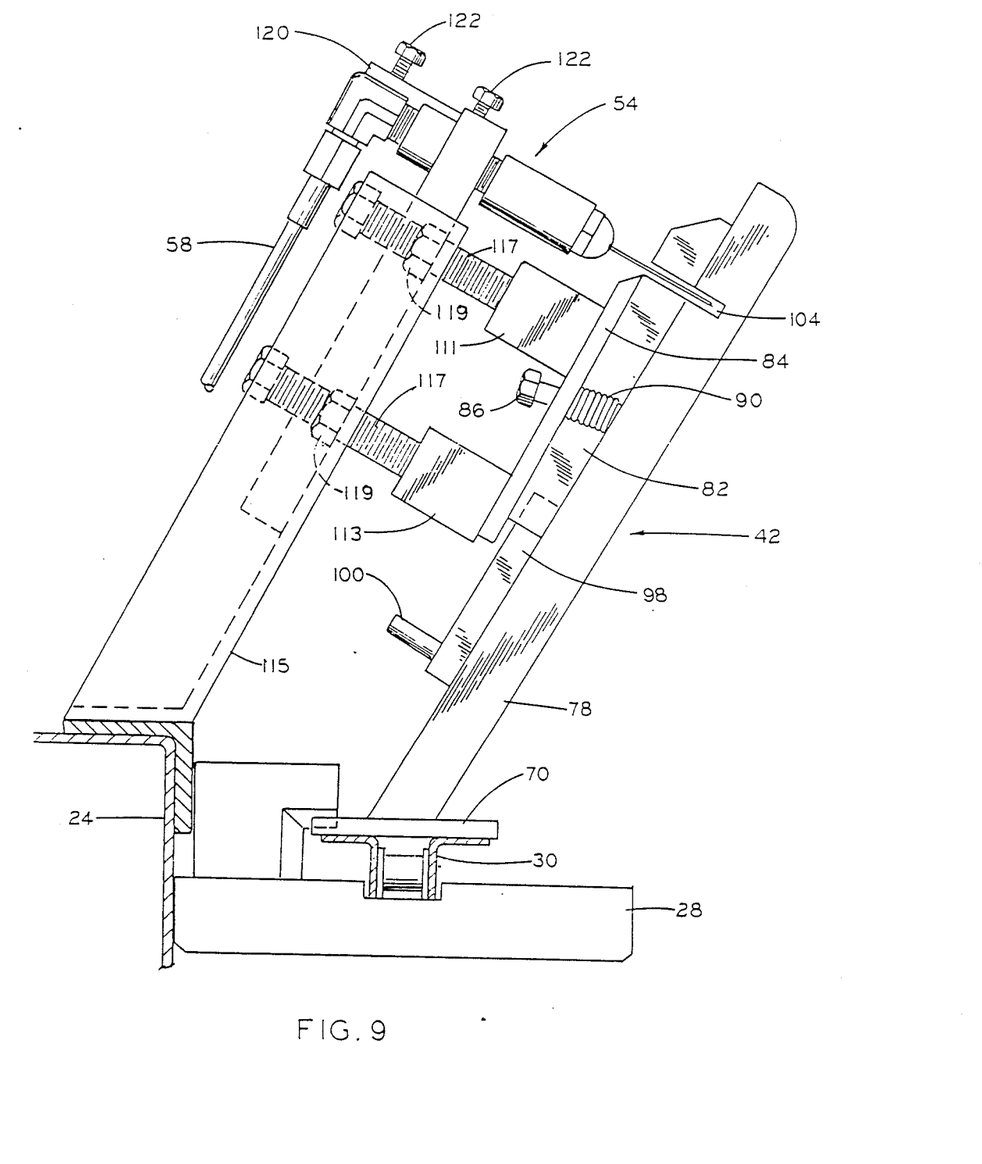
FIG. 9 is a partial side sectional view of the apparatus shown in FIG. 1 illustrating the relative location of a to the cutting means provided in the present invention.

Further, the consistent loading of the breast portion is aided by the yieldable nature of front wall 84 to rear wall 80 provided by spring 90. Since walls 80 and 84 are yieldably connected within limits controlled by the position of nuts 92 on threaded posts 90, the breast portions are easily loaded by the operator However, to assure that the volume of the sizing chamber remains consistent at the time of trimming, a pair of elongated members 111 and 113 fixed to the ends of threaded members 117 are adjustably mounted to support plate 115 via adjustable lock nut 119. Support plate 115 carries water knife 54 in the form of a jet nozzle and its mounting member and is itself welded to frame member 24. Elongate members 111 and 113 are supported to extend longitudinally along and parallel to the path of mandrel 42 to engage the front wall 84 of each mandrel 42 just before and during travel past the cutting station.

Preferably, the forward ends of members 111 and 113 are rounded or tapered to permit the leading edge of front wall 84 to pass the forward end portion prior to engagement of wall 84 with the remainder of the length of each member to compress wall 84 against spring 90 to force front wall 84 toward the upper edges of side walls 82 during the trimming process. This feature assures a consistent volume of the sizing chamber is maintained when the trimming cut is made. Any excess meat tends to be squeezed upwardly through the top opening 94 to be trimmed away at the cutting station as described herein. After the trim cut is made and mandrel 42 travels past the downstream end of members 111 and 113, spring 90 urges front wall 84 outwardly to its original position. This facilitates removal of the meat portion at the unloading station via the action of gravity and knockout member 98. The preferred material for members 111 and 113 may be any of the well-known durable plastic material having an acceptable degree of self-lubricity which resists frictional wear and is safe for food handling processes.

The position of blocks 111 and 113 may be easily adjusted toward or away from mandrels 42 by the position of lock nut 119 to vary the length of fasteners 117 extending beyond plate 115.

Other means or various constructions could also be employed to apply force to wall 84 against spring 90 to accomplish the same result without departing from the spirit of the present invention.

After passing block 108 mandrels 42 reach a cutting station defined by water knife 54. Water knife 54 is in the form a conventional high pressure jet nozzle which delivered a thin stream of water directed closely adjacent to the upper edge of front wall 84 to contact the meat portion extending above the top of wall 84 and outside the selected confines of the sizing chamber. This line also conform closely with slot 104 provided in mandrel 42. Knife 54 is fed high pressure water, preferably about three thousand psi to fourteen psi, via line 58 connected to water pump assembly 52.

Immediately adjacent to water knife 54, a sharpened blade 118 may be optionally provided as an auxiliary cutting means to assure the excess meat is fully severed from that portion disposed within the sizing chamber. The inner end of blade 118 is mounted between a pair of gripping surfaces 120 and held in position via threaded fasteners such as 122 in a conventional manner.

When the optional blade 118 is used, it is positioned to extend at least partially into slot 104 to assure engagement with any meat portion which may have been only partially severed by water knife 54.

As mandrel 42 continues to the left as shown in FIG. 1, it reaches the downwardly curved end section of chain 30. At this position, the severed excess meat portion is contacted by rotating brush 66 which ensures that this excess "scrap" portion is removed and falls onto a separate collection zone prior to the unloading of the selected meat portion remaining in the sizing chamber.

Mandrels 42 continue on chain 30 to the inverted position best seen in FIG. 1. At this point an inclined rod 124 fixed to frame 20 is positioned to engage post 100 fixed to knock-out member 98. As mandrel 42 continues to the right in the inverted position, post 100 rides along inclined rod 124 to force knock-out member 98 to slide into the sizing chamber through bottom opening 96 and force the selected meat portion, with the aid of gravity, to fall onto a separate collection zone defined by conveyor 44, for example.

The now empty mandrel 42 continues to return to the original loading station to repeat the above described sequence.

After each mandrel 42 passes the unloading station and prior to returning to the loading station, they pass through a low pressure spray of water directed from a spray nozzle 126 which is fed through hose 60 connected to pump assembly 60. This provides cleansing action to each mandrel and maintains them in a wet condition which tends to make loading and unloading the meat portion from the sizing chamber relatively easier.

Now referring to FIGS. 11–15, a modified cutting means and mandrel for use with the apparatus shown in FIG. 1 is illustrated which provides for an arcuate trim cut to be made to the breast portion loaded in the mandrel. The arcuate trim cut of the breast portion is preferred by some customers for the more pleasing "natural" appearance of the breast portion.

As seen in FIGS. 12–15, the modified mandrel 42-B includes a base 70-B provided with spaced threaded fasteners 74-B welded to the bottom surface of base 70-B for removable attachment to the wing flanges 76 provided on chain 30 in the same manner as the mandrels 42 previously described herein.

Figure 12:
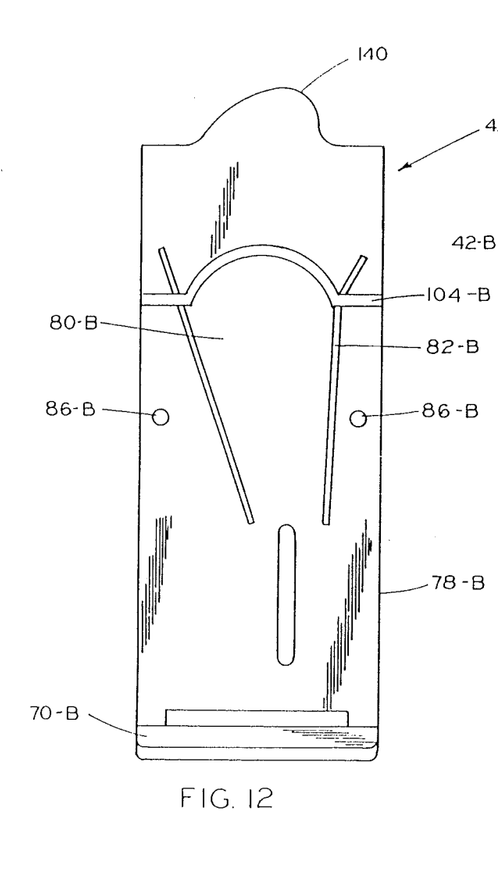
FIG. 12 is a front elevational view of the modified mandrel shown in FIG. 11.
Figure 13:
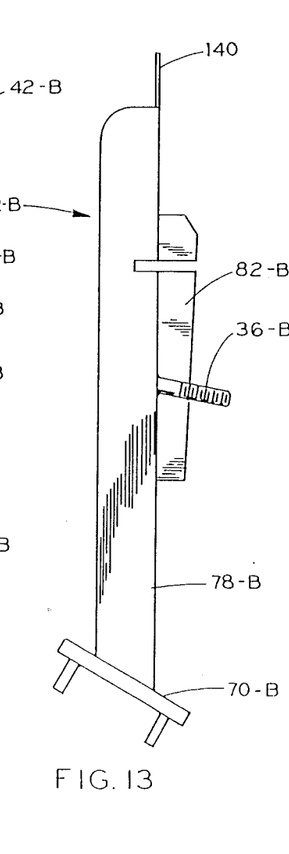
FIG. 13 is a side elevational view of the mandrel shown in FIG. 12.
Figure 14:
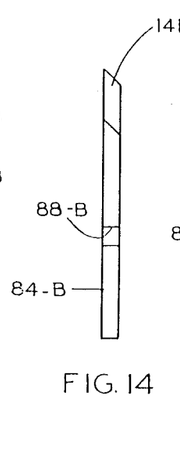
FIG. 14 is a side elevational view of the modified front wall or closure member for use with the modified mandrel shown in FIG. 12.
Figure 15:
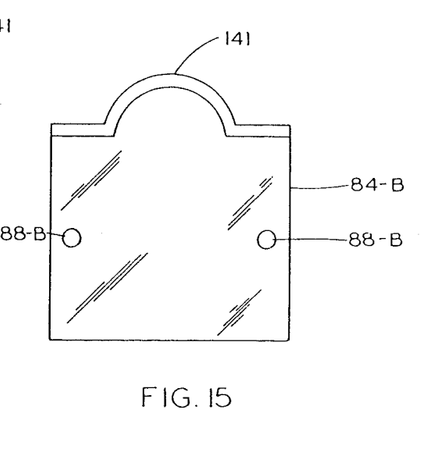
FIG. 15 is a front elevational view of the modified front wall shown in FIG. 14.

Mandrel 42-B includes a support member 78-B fixed to base 70, by welding for example, and supports a sizing chamber formed by a rear wall 80-B, side walls 82-B and a front wall 84-B yieldably fixed to rear wall 80-B in the identical manner as previously described regarding mandrels 42. Threaded posts 86-B are provided and aligned to extend through spaced bores or holes 88-B provided in front wall 84-B.

The primary difference in modified mandrel 42-B resides in providing an arcuate cam surface 140 on the upper portion of support member 78-B and an accurate slot 104-B which conforms generally to an arcuate upper edge 141 provided on front wall 84-B.

Figure 11:
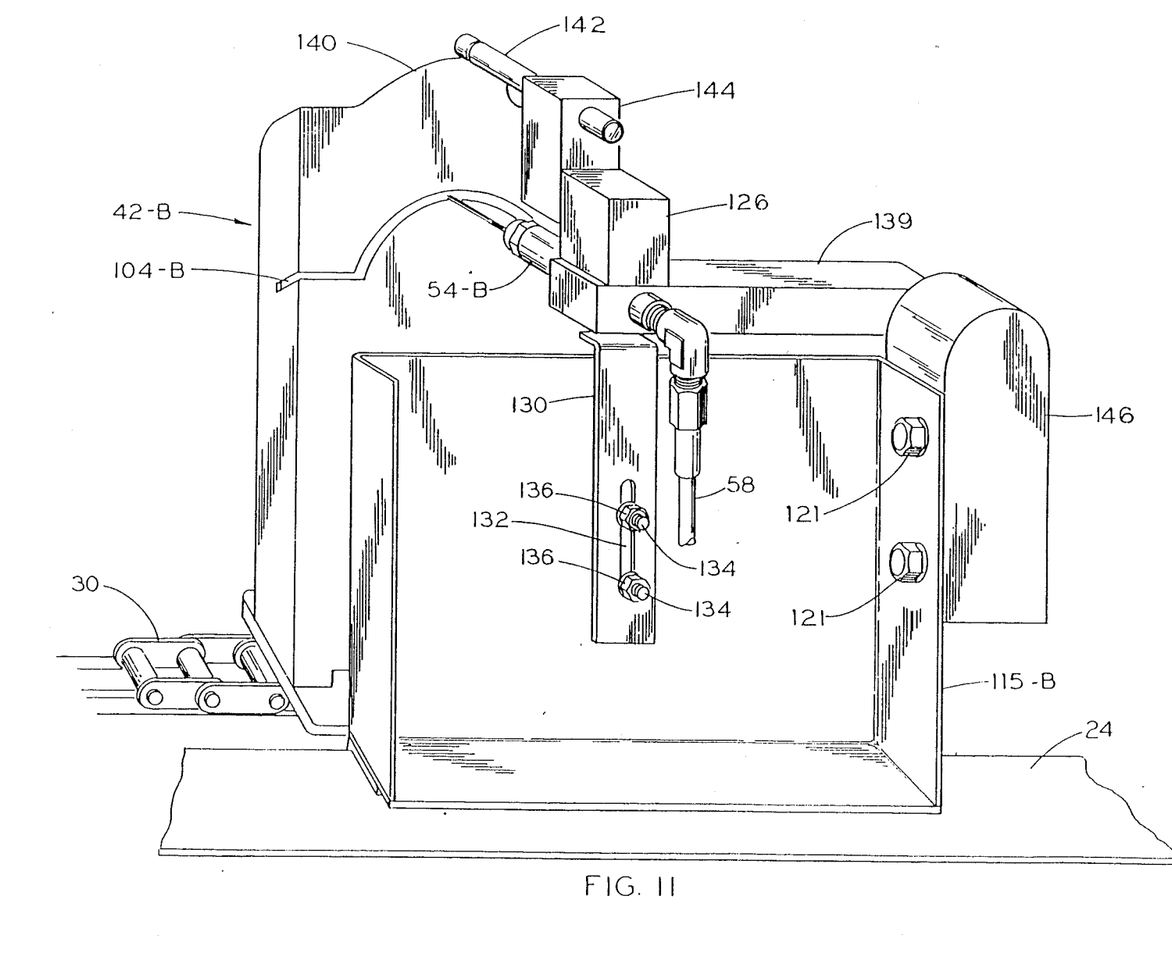
FIG. 11 is a partial perspective view of a modified cutting knife and mandrel for use with the apparatus shown in FIG. 1 to provide an arcuate trim cut to breast portions loaded in the mandrel.

Now referring to FIG. 11, a modified water knife 54-B is mounted on the outer end of a rotatably mounted arm 139. Arm 139 may be freely mounted for rotation to a support bracket 146 in any conventional manner. Bracket 146 is fixed by a pair of threaded fasteners 121 to mounting plate 115-B, which in turn is fixed, via welding or the like, to an upper surface of frame member 24.

A rod 142 functions as a cam follower and is fixed to a first mounting block 144 which in turn is welded to a second mounting block 126. Block 126 is welded to the outer portion of arm 114 to effectively fix rod 142 to arm 119 and the nozzle of knife 54-B. Sufficient slack is provided in hose 58 to permit the relatively limited movement of knife 54-B.

An L-shaped bracket 130 is slideably mounted in a slot 132 and fixed in the desired vertical position in slot 132 by a pair of conventional threaded fasteners 134 and their associated bolts 136. The upper turned-in portion of bracket 130 functions as a stop defining the lowest position of arm 114. This lowest portion may be adjusted to set the initial position of cam follower 142 to assure its appropriate alignment for engagement with cam surface 140 on each mandrel 42-B as the mandrel travels on chain 30 past water knife 54-B.

Cam surface 140 is configured to cause water knife 54-B to initially rise and then fall via the rotation of arm 139 as dictated by the engagement of cam follower rod 142 riding on each surface 140 of a respective mandrel 42-B.

The effective path of the jet of water from knife 54-B then conforms to the curvature of slot 104-B and the upper edge 141 of front wall 84-B to cut or trim the excess meat extending above the defined sizing chamber in a selected arcuate manner. Certain customers view this arcuate configuration of the trimmed end of the sized breast portion as visually pleasing, aesthetic characteristic.

In all other aspects, the construction of the apparatus of the present invention is the same when the modified mandrels 42-B and water knife 54-B are employed except the optional auxiliary blade 1818 is omitted.

In view of the foregoing description, it should be apparent that the apparatus of the present invention represents a dramatic improvement over prior methods and means of producing controlled meat portions, particularly as applied to poultry meat and further offers increased production rates at very significant savings of labor costs.

While certain preferred embodiments of the present invention have been disclosed in detail, it is to be understood that various modifications may be adopted without departing from the spirit of the invention or scope of the following claims.

I claim:

1. An automatic meat processing apparatus for producing a plurality of meat portions having a selected size and weight comprising, in combination; (1) a support frame; (2) a plurality of mandrels mounted on said frame and aligned in adjacent relationship to one another for continuous travel along said frame in a predetermined path, each of said mandrels including a vertically extending rear wall, a pair of spaced outwardly extending side walls carried by said rear wall, and a front wall yieldably mounted in a spaced relationship to said rear wall and spring biased away from said rear wall, said walls defining a sizing chamber having a predetermined configuration, volume and top opening for receiving a selected meat portion; (3) a loading station along said predetermined path of travel of said mandrels defined at a position along said frame wherein said opening of said sizing chamber is facing generally upwardly; (4) an unloading station along said predetermined path of travel of said mandrels defined at a selected position wherein said first opening of said mandrels is inverted relative to its position at said loading station; and (5) knife means mounted on said frame and disposed at a selected position along the path of travel of said mandrels to engage and separate any excess meat extending above said first opening of said sizing chamber.

2. The apparatus defined in claim 1 including a knock-out member slideably mounted on a respective one of said mandrels for movement into the sizing chamber toward said first opening and means mounted on said frame adjacent to said unloading station to actuate said knock-out member to slide into said chamber and engage a meat portion within said chamber to force said meat portion toward said first opening.

3. The apparatus defined in claim 2 wherein each of said sizing chambers includes a second opening oppositely disposed from said first opening and having a smaller size than said first opening; a respective one of said knock-out members being slideably mounted between said rear wall and said front wall of a respective one of said sizing chambers and aligned with said second opening for slideable movement into and out of said sizing chamber.

4. The apparatus defined in claim 1 including means disposed on said support frame imparting vibratory motion to said mandrels along a selected portion of the predetermined path of travel.

5. The apparatus defined in claim 1 including a continuous chain mounted for movement on said support means, said mandrels being fixed to said chain for movement therewith defining said predetermined path; and means engaging said continuous chain between said loading and unloading stations to vibrate said chain and said mandrels along a selected portion of said predetermined path.

6. The apparatus defined in claim 5 wherein said last mentioned means include an elongated block engaging a selected length of said chain and supported on said frame by a rotating member engaging said block to cause vibratory motion to be imparted to said block, said chain and said mandrels.

7. The apparatus defined in claim 1 including means mounted on said frame and extending longitudinally along a selected portion of the path of travel of said mandrels for slidably engaging said front wall of said sizing chamber of each of said mandrels to force each of said front walls against said spring bias a selected distance toward said rear wall as each of said mandrel passes said knife means.

8. The apparatus defined in claim 1 wherein said knife means is formed by a jet water nozzle and is mounted on said support frame for vertical movement to define a selected arcuate cutting path in relationship to the travel of each mandrel past said knife means.

9. A mandrel for receiving a portion of meat having a selected shape and weight in combination with cutting apparatus, said mandrel comprising a vertically extending rear wall provided with at least one generally planar face, a pair of side walls fixed to said rear wall and extending outwardly from said planar face, said side walls being spaced from one another to define a selected configuration, and a front wall yieldably fixed in spaced relationship to said rear wall to define a sizing chamber having a selected configuration, volume and a top-opening for receiving a meat portion; and means to move said mandrel past a cutting means to sever any excess meat portion extending beyond the selected sizing chamber, said mandrel including an arcuate cam surface and said cutting means being formed by a high pressure fluid jet stream mounted for vertical movement responsive to a cam follower portion engagable with said cam surface on said mandrel as said mandrel moves past said cutting means to define an arcuate cutting path relative to excess meat extending outside of said sizing chamber.

10. An automatic meat processing apparatus for producing a plurality of meat portions having a selected size and weight comprising, in combination; (1) a support frame; (2) a plurality of mandrels mounted on said frame and aligned in adjacent relationship to one another for continuous travel along said frame in a predetermined path, each of said mandrels provided with a sizing chamber provided with a first opening conformed to receive a selected portion of meat, said sizing chamber having a configuration and volume selected to receive and contain a predetermined portion of meat; (3) a loading station along said predetermined path of travel of said mandrels defined at a position along said frame wherein said opening of said sizing chamber is facing generally upwardly; (4) an unloading station along said predetermined path of travel of said mandrels defined at a selected position wherein said first opening of said mandrels is inverted relative to its position at said loading station; and (5) knife means mounted on said frame and disposed at a selected position along the path of travel of said mandrels to engage and separate any excess meat extending above said first opening of said sizing chamber, said knife means formed by a jet water nozzle and mounted on said support frame for relative vertical movement in relationship to the travel of each mandrel past said knife means to define a selected arcuate cutting path.

11. The apparatus defined in claim 10 wherein the upper edge of said rear wall of said sizing chamber defines an arcuate cam surface and said knife means is pivoted for vertical travel responsive to the configuration of said cam surface to define said arcuate cutting path.

12. The apparatus defined in claim 10 wherein said front wall of said sizing chamber includes an arcuate upper edge generally conforming to the arcuate cutting path of said knife means.

13. A mandrel for receiving a portion of meat having a selected shape and weight in combination with cutting apparatus, said mandrel comprising a vertically extending rear wall provided with at least one generally planar face, a pair of side walls fixed to said rear wall and extending outwardly from said planar face, said side walls being spaced from one another to define a selected configuration, and a front wall yieldably fixed in spaced relationship to and biased away from said rear wall to define a sizing chamber having a selected configuration and volume and forming a top-opening for receiving a meat portion; and means to move said mandrel past a cutting means to sever any excess meat portion extending beyond the selected sizing chamber.

14. The combination defined in claim 13 including a knockout member slideably mounted for movement between a first position extending outwardly of said sizing chamber and a second position extended into said sizing chamber into engagement with a meat portion in said chamber.

15. The combination defined in claim 13 wherein said mandrel includes an arcuate cam surface and wherein said knife means is formed by a high pressure fluid jet stream mounted for vertical movement responsive to a cam follower portion engagable with said cam surface on said mandrel as said mandrel moves past said knife means to define an arcuate cutting path relative to excess meat extending outside of said sizing chamber.

* * * * *